June 27, 1961  J. GILL  2,990,541
MONITORING EQUIPMENT
Filed Jan. 22, 1957  2 Sheets-Sheet 2
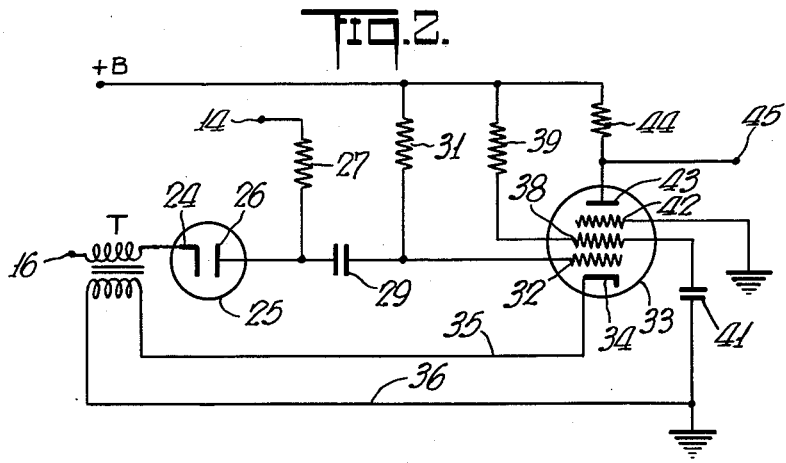
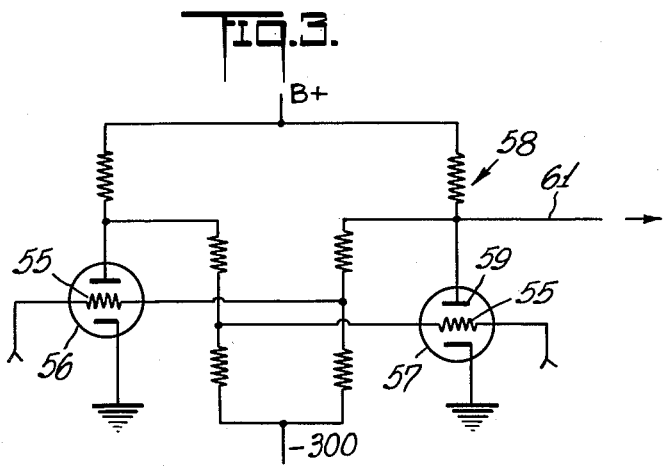
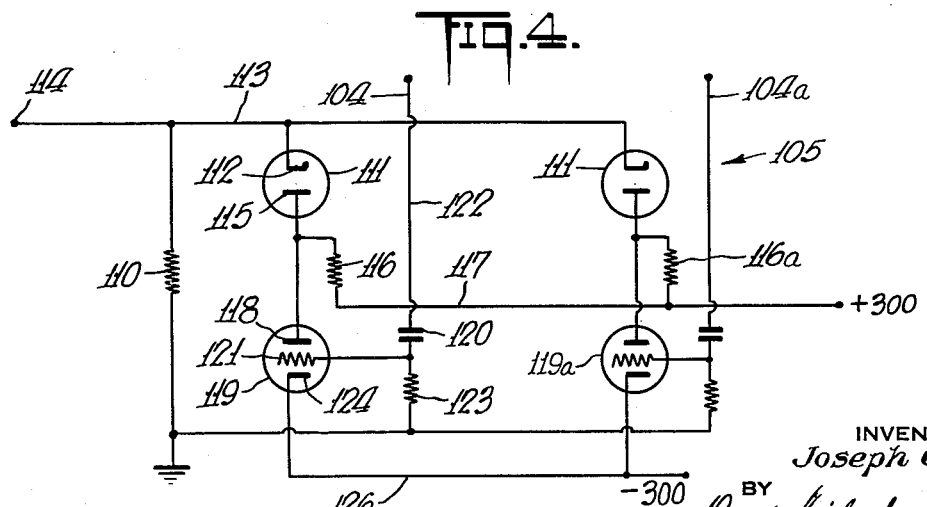
INVENTOR
Joseph Gill
BY
Dean Fairbank & Hirsch
ATTORNEYS

# United States Patent Office 2,990,541
Patented June 27, 1961

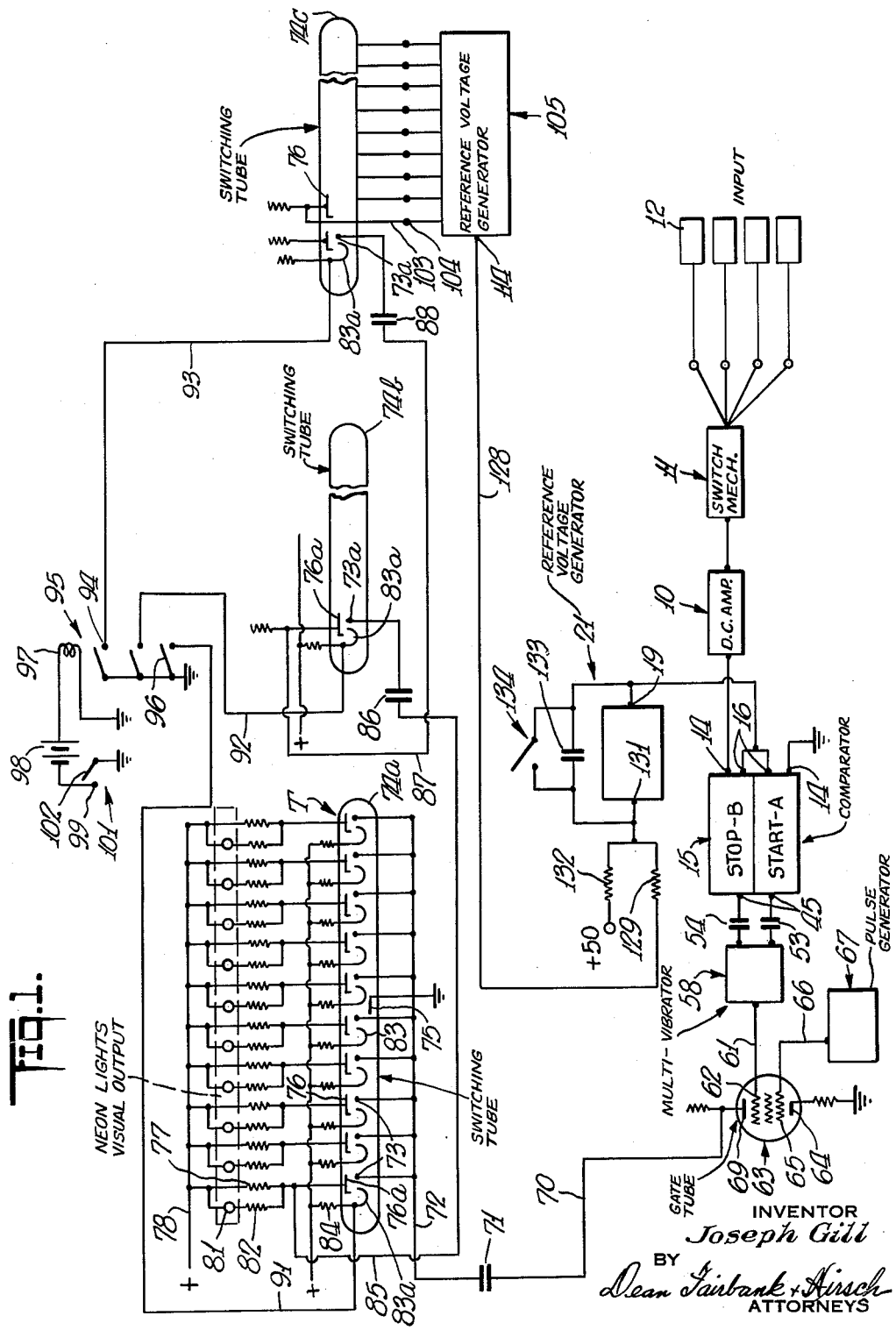

2,990,541
MONITORING EQUIPMENT
Joseph Gill, Hicksville, N.Y., assignor, by mesne assignments, to Hagan Chemicals & Controls, Inc., Pittsburgh, Pa., a corporation of Pennsylvania
Filed Jan. 22, 1957, Ser. No. 635,355
14 Claims. (Cl. 340—179)

This invention relates to the art of monitoring equipment and more particularly to equipment for indicating the value of one or more conditions monitored by suitable transducers.

As conducive to an understanding of the invention, it is noted that where the value of a condition being monitored is initially determined by a suitable transducer which has an output that is non-linear with respect to changes of the value of such condition and it is desired to provide a digital indication of such output, unless the means to actuate the digital indicator is correlated with the non-linear output from the transducer, the resultant indication will be inaccurate.

Where the non-linear output from the transducer is opposed in a balancing circuit to a voltage developed across a non-linear potentiometer wound to be correlated with such non-linear output so that the balancing circuit will actuate a digital indicator to provide the desired indication, as the potentiometer is difficult to wind, inaccuracies may result and furthermore, a potentiometer is not readily adjustable to take care of different conditions due to the use of various types of transducers.

Where the non-linear output of the transducer is fed into an amplifier having a variable gain which is a function of the transducer signal input thereto in order to compensate for the non-linearity of the transducer, due to variations in tube characteristics and the like, the resultant indication may be inaccurate.

It is accordingly among the objects of the invention to provide monitoring equipment that is relatively simple in construction, having relatively few parts and which is dependable in operation, that will provide an accurate digital indication of the value of the condition being monitored regardless of the linearity of the output of the measuring transducer with respect to changes of such value, and without the use of non-linear potentiometers, variable gain amplifiers or the like with their attendant difficulties.

Another object of the invention is to provide an equipment of the above type which is readily adaptable for use with a plurality of transducers having different non-linear outputs.

Another object of the invention is to provide an equipment which may be used to generate an output signal of amplitude varying with time in a predetermined manner.

According to the invention from its broad aspect, a variable signal generator is provided which at predetermined time intervals will successively apply a plurality of voltages of the same or different values to an integrating device which will furnish an output signal of amplitude varying with time based upon predetermined settings of the variable signal generator.

More specifically, the variable signal generator provides a signal that varies in amplitude with time in manner to be substantially exactly correlated with the non-linear output of a transducer so that at any given portion of the range of the transducer when the time base signal has a predetermined value with respect to the transducer output, the period of time that it takes the time base signal to reach such value will be proportional to the exact value of the condition being monitored.

According to a feature of the invention, the equipment comprises a comparator unit having two sections, one of which serves to compare a voltage from the reference signal generator with a given voltage value so that upon attainment of a desired comparison, periodic pulses will be delivered to actuate a suitable counting device. The other section of the comparator serves to compare the output of a transducer with a reference voltage so that when said transducer output and said reference voltage have attained a predetermined relation, pulses to said counting device will be cut off.

In the accompanying drawings in which are shown one or more of various possible embodiments of the several features of the invention, FIG. 1 is a circuit diagram of the equipment, FIG. 2 is a circuit diagram of a portion of the comparator unit, FIG. 3 is a circuit diagram of the multivibrator, FIG. 4 is a circuit diagram of the variable voltage generator.

Referring now to FIG. 1 of the drawings, the system diagrammatically shown, comprises a D.C. amplifier unit 10 which may be of the type shown in co-pending application Serial No. 602,587, now U.S. Patent 2,873,320 and hence will not be described.

The input terminal of amplifier unit 10 is successively connected through a switching mechanism 11 of any suitable type to a plurality of transducers 12 which illustratively may be temperature responsive devices each having an output voltage proportional to temperature.

The output of the amplifier 10 is connected to the signal input terminal 14 of section B of a comparator unit 15 comprising a pair of identical sections A and B. The reference signal input terminal 14 of section A is connected to ground. The reference input terminals 16 of sections A and B are connected by lead 18 to the output terminal 19 of a reference voltage generator 21 which may be a conventional summing integrator of the type which gives the integral with respect to time of the sum of input voltages. This integrator illustratively is of the type shown and described in Electronic Analog Computers, first edition, McGraw-Hill, Korn & Korn, 1952 at page 143.

Although the comparator unit 15 may be of any suitable type, in the illustrative embodiment herein each of the sections A and B may be an amplitude comparison circuit known as the "multiar." This circuit, shown in FIG. 2, which is described in the Massachusetts Institute of Technology, Radiation Laboratory Series, publication entitled "Waveforms" at page 343, comprises a transformer T, one end of one of the windings of which is connected to reference input terminal 16 and the other end of said winding being connected to the cathode 24 of a diode 25. The plate 26 of diode 25 is connected through resistor 27 to signal input terminal 14 and through capacitor 29 and resistor 31 to the B+ source and also to the control grid 32 of a pentode vacuum tube 33. The cathode 34 of tube 33 is connected by lead 35 to one end of the other winding of transformer T, the other end of said winding being connected by lead 36 to ground. The screen grid 38 of tube 33 is connected through resistor 39 to the B+ source and also to ground through capacitor 41. The suppressor grid 42 of tube 33 is grounded and the plate 43 of the tube is connected through resistor 44 to B+ supply and to output terminal 45.

Output terminals 45 of sections A and B of the comparator unit 15 are connected respectively through capacitors 53 and 54 to the control grids 55 of tubes 56 and 57 of a bi-stable multi-vibrator 58 (FIG. 3) of conventional type. The multi-vibrator is so biased that the tube 57 is normally conducting and the tube 56 is cut off.

The plate 59 of tube 57 is connected by lead 61 to the suppressor grid 62 of a gate tube 63. The cathode 64 of such tube is connected in conventional manner to ground and the control grid 65 is connected by lead 66 to a pulse generator 67 of conventional type which may be a crystal controlled oscillator. The plate 69 of gate tube 63 is connected by lead 70 through capacitor 71 to common line 72 to which all of the grids 73 of a conventional switching tube T are connected. Although any switching tube may be used, in the illustrative embodiment shown, a "Burroughs" magnetic beam switching tube is employed, this tube having ten grids connected to common lead 72 and associated with numerals zero through nine respectively. The beam electrode 75 of tube T is connected to ground and the ten targets 76 are connected respectively through resistors 77 to lead 78 connected to the B+ source.

In parallel with each of the target resistors 77 is series connected neon lamp 81 and resistor 82, the neon lamp providing an indication of current flow through the associated resistor 77. The tube T has an element known as a spade 83 associated with each of the grids and targets, each of such spades being connected through a resistor 84 to a positive potential.

In the illustrative embodiment shown, three of such beam tubes T are provided, designated 74a, 74b and 74c, associated with units, tens and hundreds, respectively, each of such tubes having the neon indicators 81 previously described. The first target 76a of the units tube 74a associated with the zero count is connected by lead 85 through capacitor 86 to the first grid 73a of "tens" tube 74b and the associated first target 76a of tube 74b is connected by lead 87 through capacitor 88 to the first grid 73a of the "hundreds" tube 74c. The first spade 83a of each of the tubes 74a, 74b and 74c related to units, tens and hundreds is connected by an associated lead 91, 92 and 93 respectively to fixed contacts 94 of a reset relay 95, the movable contact arms 96 of which are ganged together and connected to ground. One end of the coil 97 of relay 95 is connected to ground and the other end of such coil is connected through battery 98 to fixed contact 99 of a normally open resetting switch 101, the movable contact arm 102 of which is connected to ground.

The targets 76 of all but the zero section of the hundreds tube 74c related to the hundreds count from one to nine respectively, are connected respectively by leads 103 to the nine input terminals 104 of a variable voltage generator unit 105 (FIG. 4).

As is clearly shown in FIG. 4, the variable voltage generator comprises nine identical sections each having a diode 111, the cathode 112 of which is connected to common line 113 which in turn is connected to output terminal 114 and through common resistor 110 to ground. The plate 115 of the diode 111 is connected through a resistor 116 to common lead 117 which is connected to a positive 300 volt source in the illustrative embodiment shown. In addition, the plate 115 of the diode 111 is connected to the plate 118 of a triode tube 119. The control grid 121 of tube 119 is connected through capacitor 120 and lead 122 to the associated input terminal 104 and also through resistor 123 to ground. The cathodes 124 of tubes 119 are connected to common lead 126 which is connected illustratively to a negative 300 volt source. Thus the grids 121 of tubes 119 are positive with respect to cathode 124 and tubes 119 will be conducting.

The parameters are so chosen that the plate 118 of tube 119 when conducting is negative with respect to ground which insures that diode 111 will not be conducting because its plate is negative with respect to its cathode which is at ground potential.

The output terminal 114 of the variable voltage generator 105 is connected by lead 128 to one end of fixed resistor 129, the other end of which is connected to input terminal 131 of reference voltage generator 21.

Also connected to input terminal 131 of the reference voltage generator is one end of a fixed resistor 132, illustratively of equal value to resistor 129, the other end of which is connected to a source of voltage of predetermined value, illustratively 50 volts. The output 19 of the reference voltage generator 21 is connected through a capacitor 133 to the input terminal 131 to provide feedback.

The capacitor 133 of the reference voltage generator is desirably shunted by a normally open switch 134 so that the capacitor 133 may be discharged for each integrating action.

For purpose of illustration, it is assumed that the output of the temperature responsive transducer 12 is a non-linear curve, i.e., say for a temperature change from zero to 100 degrees, the signal voltage output from the transducer amplified by D.C. amplifier 10 will be from zero to one volt; from 100 to 200 degrees, the voltage output will be from one to 2.5 volts; from 200 to 300 degrees, the voltage output will be from 2.5 to 3.75 volts and from 300 to 400 degrees, the voltage output will be from 3.75 to 5.5 volts. It is further assumed that for each 100 degree interval, the slope is linear. If it isn't, of course smaller intervals can be used. Since it is desired to have a digital output it is necessary to measure discrete counts that are functions of time. Consequently, the signal voltages must be related to a time base so that for each value of signal voltage there is a given time period. This is accomplished by comparing the signal voltage with a reference voltage that varies with time, i.e., a saw tooth voltage, that is formed by integrating a constant voltage.

Thus, if one pulse from the pulse generator 67 is equal to one degree of temperature and the pulse generator is a 100 kc. oscillator, then each degree is equal to 10 micro-seconds. Thus, to have an indication from zero to 100 degrees, which requires 100 pulses, it will take one milli-second (.001 sec.) for the generator 67 to supply sufficient pulses to make this indication.

Consequently, to indicate temperatures from zero to 100 degrees, for accurate count we must relate the signal voltage to a time varying reference voltage that changes at the rate of one volt per milli-second so that it will take one milli-second for the reference voltage to reach one volt. Assuming that the initial constant voltage to be integrated, applied to resistor 132 is 50 volts, the time constant of the integrator 21 must be .05, i.e.

$$\frac{1}{.001} = \frac{50}{X} \text{ or } X = .05 \text{ second}$$

Thus, the slope of the output voltage from the reference voltage generator 21 is at the rate of 50 volts per 50 milli-seconds and to provide such slope the resistor 132 and capacitor 133 could have values of 50K and one $\mu f.$ respectively.

Similarly, from 100 to 200 degrees the signal voltage must be related to a time varying reference voltage that changes at the rate of 1.5 volts per milli-second, and with a fixed time constant of .05 for the integrator 21, for accurate count, the voltage that is integrated must be 75 volts. From 200–300 degrees, the voltage must be 62.5 volts and from 300 to 400 degrees, 87.5 volts.

Thus, assuming the signal voltage is .5 volt representing a temperature of 50 degrees, as the slope of the reference voltage is 50 volts per .05 second, it will take the reference voltage .0005 second to reach .05 volt and during the period the oscillator 67 will deliver 50 pulses.

Since the fixed reference potential is 50 volts, and the time constant of the integrator is fixed at .05 second by reason of the fixed resistor 132 (50K) and capacitor 133 (1 $\mu f.$), it is apparent that if an additional voltage of 25 volts should be integrated, also with a time constant of .05 second, the slope of the resultant integrated voltage is 75 volts per .05 second to match the slope of the signal voltage of 1.5 volts from 200 to 300 degrees, i.e., 1.5 volts per .001 second.

It is of course to be understood that by having resistor 129 of 25K, the voltage applied thereto could be 12.5 volts. Thus, the time constant of resistor 129 (25K) and capacitor 133 (1 µf.) is .025 so that the slope of the 12.5 volts is 12.5 volts per .025 second which is equal to the slope of 25 volts per .05 second.

*Operation*

To start the equipment for an indicating cycle, the switch 101 is momentarily closed to energize relay 95, thereby grounding the spades 83a of tubes 74a, 74b and 74c. The grounding of the spades 83a which are related to the zero position of the associated tube will cause the beams of such tubes all to move to such zero position so that the corresponding neon lamps 81 will be energized. The reference voltage generator or integrator 21 is also reset by momentary closure of switch 134 which will discharge the capacitor 133.

With the fixed voltage of +50 volts applied to resistor 132 of the reference voltage generator 21, the latter will then integrate this voltage with a time constant of .05 second in the illustrative embodiment shown. As a result, a negative going saw tooth voltage will appear at terminal 19 as the capacitor 133 is charged. This negative going signal will be applied to terminals 16 of sections A and B of the comparator 15.

Referring to FIG. 2, the tube 33 of section A is ordinarily conducting strongly and the plate 26 of tube 25 is connected through resistor 27 to terminal 14 which is connected to ground. Since the negative going saw tooth voltage from generator 21 which is fed to terminal 16 of section A is intentionally clamped above ground potential, the cathode 24 of tube 25 connected through transformer T to terminal 16 is at a more positive potential than plate 26 and the tube 25 is not conducting. When the saw tooth voltage drops to equal the reference point or ground potential connected to terminal 14 the diode 25 will conduct to complete the circuit to the control grid 32 of tube 33. This will cause the blocking oscillator including tube 33, conducting tube 25, transformer 16 and associated components to function to drive tube 33 to cut off. As a result, there will be a rapid rise of the plate potential of tube 33 which will appear at output terminal 45.

This positive going voltage will be applied through capacitor 53 to the control grid 55 (FIG. 3) of normally cut off tube 56 of the multi-vibrator 58 thereby causing such tube to conduct so that the plate voltage thereof will drop rapidly. As a result, the control grid of tube 57 will be driven negative to cut off tube 57. This will cause the plate voltage of tube 57 to rise so that the suppressor grid 62 of normally cut off gate tube 63 will become positive so that such tube will conduct with the result that the pulses from the pulse generator 67 will appear as negative pulses at the plate 69 of gate tube 63 and will be impressed on the grids 73 of beam tube 74a.

As the beam of tube 74a is directed to the first target 76a by reason of the resetting of such tube, as previously described, when the first negative pulse from generator 67 is applied to the grids 73, the beam will move to the second target. As a result, the current through the target resistor 77 associated with the first target will drop, to cut off its associated neon lamp 81 and the current through the target resistor associated with the second target will rise so that the associated neon lamp will be illuminated to show the unit 1.

As pulses are successively applied to the grids 73 of tube 74a, it is apparent that successive neon lamps will be illuminated. When the lamp 81 representing the unit 9 is illuminated, the next pulse will cause the beam to move back to the first or zero position. When this occurs, the drop in target voltage due to conduction of the first section of tube 74a will cause a negative pulse to be applied through lead 85 and capacitor 86 to the grids 73 of the second tube 74b.

As a result, the beam of the second tube will move from position zero to position 1 representing ten pulses. As additional pulses are supplied by the pulse generator to the grid of tube 74a, each ten pulses, a pulse will be delivered to the grids of tube 74b to count tens and similarly, each 100 pulses, a pulse will be delivered to the grids of tube 74c to count hundreds.

Assuming that the temperature of the unit monitored by the first transducer 12 is to be measured, with the switch 11 connecting this transducer in circuit, a D.C. voltage will be fed to amplifier 10 proportional to such temperature and the amplified voltage which is negative in polarity is fed to terminal 14 of section B of comparator 15.

Assuming that the negative voltage is equal to say 2.75 volts related to a temperature of 220 degrees, such voltage is fed to the input terminal 14 of section B of comparator 15 to be applied to the plate 26 of tube 25 (FIG. 2).

When the negative going saw tooth voltage from the reference voltage generator 21 which is applied to terminal 16 of section B, reaches one volt which will take .001 second, 100 pulses will have been delivered by the pulse generator 67 to the beam tubes T as previously described, and the tube 74c will be indicating the one hundred digit. Thus, the beam of tube 74c will be directed against the second, or one hundred target 76.

As a result of the current flow through the associated section of tube 74c, the neon lamp 81 associated with the one hundred digit will be energized and the voltage at the associated target will drop to provide a negative going voltage through lead 103 and terminal 104 to the grid 121 of the variable voltage generator 105 (FIG. 4). This will cut off the normally conducting tube 119 so that current will flow from the +300 volt source through resistor 116, diode 111, lead 113 and resistor 110 to ground. As the resistors 116 and 110 form a voltage divider, it is apparent that with a proper selection of values of such resistors, the voltage across resistor 110 between junction X and ground can be 25 volts. Thus, for example, with resistor 110 having an effective value of 10K and with an applied voltage of 300 volts, assuming the drop across tube 111 to be negligible, resistor 116 would have to have a value of 110K.

Thus, 25 volts will be applied from terminal 114 through lead 128 to resistor 129 of the reference voltage generator 21. Hence, a combined voltage of 75 volts will now be integrated with a time constant of .05 second as desired.

Consequently, non-linearity in the output voltage from the transducer will be compensated by the voltage from the variable voltage generator 105. As pulses continue to be applied to the tubes 74a, 74b and 74c, when the tube 74c has reached the second hundred digit a negative going voltage will be applied through lead 103 and terminal 104 to the second tube 119a in the variable voltage generator 105 will cut off and in the manner previously desired, the associated resistor 116a which has a value of 230K and resistor 110 which has the effective value of 10K will form a voltage divider so that 12.5 volts will appear across resistor 110 to be applied to resistor 129 of the reference voltage generator 21.

The reference voltage generator will thereupon integrate 62.5 volts with a time constant of .05 second so that it will provide an output voltage to compensate for the non-linearity of the transducer output up to 300 degrees.

When the voltage from the reference voltage generator reaches the value of the amplified voltage from the transducer, i.e., 2.75 volts, which will take .0022 second, the units tube 74a will have counted to "0," the tens tube 74b to "2" and the hundreds tube 74c to "2." Thus, there will be a reading of 220 degrees on the neon lights associated with tubes T.

When the voltages applied to terminals 14 and 16 of section B of the comparator 15 are equal, as previously described, tube 33 of section B will be cut off and a positive going voltage will be applied to the grid 55 of tube 57 of the multivibrator 58 which is now cut off. As a result, the tube 57 will conduct and tube 56 will be cut off.

When tube 57 conducts, its plate voltage will drop and a negative going voltage will be applied through lead 61 to the suppressor grid 62 of gate tube 63 so that no further pulses will be delivered to tube 74a and the neon lamps 81 thereof will remain set at a 220 degree indication.

After a predetermined period sufficient to permit completion of an integrating cycle, by means of a suitable programming circuit (not shown) the switches 134 and 101 are closed to reset the unit 21 and the tubes T and the cycle above described is repeated.

Due to the speed of indication and recycling, the readings on neon lamps 81 will appear to remain fixed and will only vary when the output voltage from the transducer 12 varies.

In usual operation of the system, the switch 11 successively connects the transducers 12 into circuit each five seconds for example to give an attendant sufficient time to visually inspect the indicated readings and also to permit a suitable recording typewriter electrically connected to the tubes T in conventional manner, sufficient time to record the readings.

With the equipment above described, accurate digital indications may be obtained from transducers whose outputs are non-linear with respect to the value of the condition being monitored.

It is within the scope of the invention to dispense with the fixed voltage applied to the reference voltage generator 21 and have the variable voltage generator 105 alone furnish voltages that have the proper values for generation of the desired time varying signals by the reference voltage generator 21. In such case the resistor 132 can be eliminated.

It is also within the scope of the invention to have the reference voltage generator 21 generate a time varying signal that goes above and below a zero reference. In such case the reference voltage applied to resistor 132 would initially be negative and the voltage from the variable voltage generator would be positive of desired value.

It is further within the scope of the invention to provide a signal having a predetermined relationship between voltage magnitude and time, to be used for various applications, such as for instruction purposes or as function generators for analog computers.

A system for such purposes would require only the variable voltage generator 105 and the integrator 21 with suitable means to actuate the variable voltage generator at predetermined times so that the output from the integrator would be a curve of predetermined characteristics.

As many changes could be made in the above equipment, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A system for indicating the value of a condition being monitored by a non-linear transducer which provides an electrical signal of value proportional to the value of such condition, said system comprising a reference generator to provide an electrical signal whose value varies with time, a pulse generator to supply pulses at predetermined time intervals, a pulse operated counting device, means to apply pulses from said pulse generator to said counting device when the signal from said reference generator is of a predetermined value, means to discontinue the application of pulses to said counting device when said reference generator signal has a predetermined relation to the value of the condition being monitored and means controlled by the counting device at predetermined intervals during the duration of the signal from the reference generator based upon the value of the count, to change the slope of the signal from the reference generator continuously to follow a predetermined curve corresponding to the known non-linear output characteristics of the transducer.

2. The combination set forth in claim 1 in which the reference generator is an integrating device which provides a time varying voltage output.

3. The combination set forth in claim 1 in which a vacuum tube is electrically connected between said counting device and said pulse generator to control pulses to said counting device from said pulse generator, and means controlling said vacuum tube to discontinue the application of pulses to said counting device when said reference generator signal has a predetermined relation to the value of the condition being monitored.

4. The combination recited in claim 1 in which the counting device comprises a plurality of magnetic beam tubes each having a multiplicity of sections including a grid, a collector and a spade and a common emitter is associated with each of said sections, a multiplicity of resistors connected at one end respectively to each of said collectors and adapted to be connected at their other ends to a source of positive potential, a multiplicity of resistors connected at one end to each of said spades respectively and adapted to be connected at their other ends to a source of positive potential, the sections of each of said tubes being associated with the digits "0" through "9" respectively, the collector of the section of one of said tubes associated with the "0" digit being connected to the grids of another of said tubes, said pulses being applied simultaneously to the grids of said first tube, whereby current will successively flow through the multiplicity of collector resistors of said first tube and when the beam of said first tube has returned to the zero section a negative pulse will be delivered to the grids of the other beam tube, and means to ground the spades of said beam tubes to restore the beam thereof to zero position, a neon lamp and associated resistor shunted across each of the collector resistors of said beam tubes, a group of collectors of the last beam tube being connected to said variable signal generator to cause successive application of the multiplicity of signals generated thereby to said signal generating device when current flows through the successive collector resistors of said last beam tube.

5. The combination set forth in claim 1 in which the counting device comprises a magnetic beam tube having a multiplicity of sections each having a grid, a collector and a spade and a common emitter is associated with each of said sections, a multiplicity of resistors connected at one end respectively to each of said collectors and adapted to be connected at their other ends to a source of positive potential, a multiplicity of resistors connected at one end to each of said spades respectively and adapted to be connected at their other ends to a source of positive potential, said pulses being applied simultaneously to said grids, whereby current will successively flow through the multiplicity of collector resistors, a group of said collectors being connected to said variable signal generator to cause successive application of the multiplicity of signals generated thereby to said signal generating device when current flows through the successive collector resistors.

6. The combination recited in claim 5 in which a neon tube and associated resistor are provided shunted across each of the multiplicity of resistors connected to said collectors.

7. The combination set forth in claim 1 in which the last named means comprises a variable signal generator having an output electrically connected to the input of said reference generator, said variable signal generator having means, based upon the operation of said counting device, to provide a multiplicity of signals of predetermined values, each related to a portion of the curve of transducer output with respect to the value of the condition being monitored to adjust the slope of the signal from the reference generator.

8. The combination set forth in claim 7 in which said reference generator is an integrating device which provides a time varying signal output, said reference generator including a resistor in series with said input and a capacitor shunted across the input and output of said reference generator.

9. The combination recited in claim 8 in which means are provided to discharge said capacitor to recycle said integrating device.

10. The combination set forth in claim 8 in which a second resistor is connected at one end to the input of said reference generator, whereby a signal of predetermined amplitude may be connected to the other end of said second resistor.

11. The combination set forth in claim 8 in which a second resistor is connected at one end to the input of said reference generator whereby a signal of predetermined amplitude may be connected to the other end of said second resistor, said two resistors being of the same value.

12. The combination set forth in claim 8 in which a second resistor is connected at one end to the input of said reference generator whereby a signal of predetermined amplitude may be connected to the other end of said second resistor, said two resistors being of different values having a predetermined relation.

13. The combination set forth in claim 7 in which said variable signal generator has an output and has a multiplicity of sections each comprising a vacuum tube adapted to be normally conductive, said tube having a control grid, a plate and a cathode, and a diode having a plate connected to the plate of said vacuum tube and a cathode connected to the output of said variable signal generator, a resistor electrically connected at one end to said connected plate and cathode and adapted to be connected to a source of positive potential at its other end, said variable signal generator having a multiplicity of inputs connected respectively to the grids of said vacuum tubes and a resistor common to all of said sections having one end connected to said output and the other to ground.

14. The combination set forth in claim 13 in which means are provided successively to apply a negative going pulse to the multiplicity of inputs of said variable signal generator whereby the normally conducting vacuum tubes will be successively cut off to effect conduction of the associated diode for current flow through said common resistor and the resistor associated with the related section, to develop a voltage across said common resistor which appears at said output.

References Cited in the file of this patent
UNITED STATES PATENTS

| | | |
|---|---|---|
| 2,389,275 | Rayner et al. | Nov. 20, 1945 |
| 2,681,411 | Washburn | June 15, 1954 |
| 2,683,807 | Paxson | July 13, 1954 |
| 2,708,745 | Chappell et al. | May 17, 1955 |
| 2,717,994 | Dickinson | Sept. 15, 1955 |
| 2,752,555 | Light | June 26, 1956 |
| 2,787,418 | Macknight | Apr. 2, 1957 |
| 2,808,560 | Jaffe | Oct. 1, 1957 |
| 2,839,744 | Slocomb | June 17, 1958 |
| 2,840,806 | Bateman | June 24, 1958 |
| 2,845,597 | Perkins | July 29, 1958 |
| 2,897,486 | Alexander et al. | July 28, 1959 |